US007492358B2

United States Patent
Chi et al.

(10) Patent No.: US 7,492,358 B2
(45) Date of Patent: Feb. 17, 2009

(54) RESISTIVE SCANNING GRID TOUCH PANEL

(75) Inventors: Hye S. Chi, Raleigh, NC (US); Timothy W. Crockett, Raleigh, NC (US); Albert V. Makley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 10/867,830

(22) Filed: Jun. 15, 2004

(65) Prior Publication Data

US 2005/0275634 A1 Dec. 15, 2005

(51) Int. Cl.
*G06F 3/045* (2006.01)
*G06F 3/041* (2006.01)
(52) U.S. Cl. .................................. 345/173; 178/18.05
(58) Field of Classification Search ......... 345/173–174; 178/18.01–18.11
See application file for complete search history.

(56) References Cited

U.S. PATENT DOCUMENTS

| | | | |
|---|---|---|---|
| 4,587,378 A | 5/1986 | Moore | |
| 4,731,694 A | 3/1988 | Gräbner et al. | 361/280 |
| 5,880,411 A * | 3/1999 | Gillespie et al. | 345/173 |
| 5,914,465 A | 6/1999 | Allen et al. | 174/18.06 |
| 5,945,980 A | 8/1999 | Moissev et al. | 345/173 |
| 6,492,979 B1 | 12/2002 | Kent et al. | 345/173 |
| 6,535,203 B2 | 3/2003 | Shigetaka et al. | 345/173 |
| 6,762,752 B2 * | 7/2004 | Perski et al. | 345/173 |
| 7,030,860 B1 * | 4/2006 | Hsu et al. | 345/173 |
| 2002/0011991 A1 | 1/2002 | Iwasaki et al. | 345/173 |
| 2002/0171634 A1 | 11/2002 | Matsufusa | 345/173 |
| 2003/0052867 A1 | 3/2003 | Shigetaka et al. | 345/173 |
| 2003/0098858 A1 | 5/2003 | Perski et al. | 345/173 |
| 2003/0103043 A1 | 6/2003 | Mulligan et al. | 345/174 |
| 2004/0217945 A1 * | 11/2004 | Miyamoto et al. | 345/173 |

FOREIGN PATENT DOCUMENTS

JP 10222303 8/1998

* cited by examiner

*Primary Examiner*—David L Lewis
(74) *Attorney, Agent, or Firm*—Sawyer Law Group LLP

(57) ABSTRACT

An improved resistive touch panel is disclosed. The improved resistive touch panel includes a first plurality of stripes of a resistive coating on a front sheet running in a first direction and a second plurality of stripes of a resistive coating on a back sheet running in a second direction. The overlapping regions between the first and second plurality of stripes are scanned by a controller circuit to detect voltage drops at these regions. Because the overlapping regions are independent of each other, the controller circuit is able to detect the individual regions involved in the touch area. In this manner, the controller circuit is able to determine between small and large areas of contact by detecting adjacent contact areas.

5 Claims, 5 Drawing Sheets

$$Xpos = \frac{X-H}{Y}$$
$$Ypos = \frac{Y-L}{X}$$

RESISTIVE SCANNING GRID TOUCH PANEL

FIELD OF THE INVENTION

The present invention relates to resistive touch screen, and more particularly to distinguishing of a small point of contact from multiple points of contact or a large point of contact on a resistive touch screen.

BACKGROUND OF THE INVENTION

FIG. 1 illustrates a conventional resistive touch panel. The panel includes a front sheet 101 and a back sheet 102. To both front and back sheets 101-102 are applied a continuous resistive coating. The front sheet 101 is typically composed of a clear flexible material, while the back sheet 102 is typically a clear rigid piece material. The front and back sheets 101-102 are separated by insulating spacer dots (not shown). Pressure applied to the front sheet 101 causes its continuous resistive coating to contact the continuous resistive layer on the back sheet 102. The point of contact closes a circuit. The voltage drop across the back sheet 102 between the Y edge and the L edge of the back sheet is used to measure the position of the contact in the Y direction. The voltage drop across the front sheet 101 between the X edge and the H edge of the front sheet 101 is used to measure the position of the contact in the X direction.

FIG. 2 illustrates a controller circuit for the conventional resistive touch panel. The controller circuit 200 includes four analog-to-digital converters (A2D) 201 and a microcontroller 202. The controller circuit 200 drives a current through one of the resistive coatings by connecting one edge to the drive voltage and the other edge to ground. The controller circuit 200 switches between driving the current through the resistive coating on the front sheet 101 and the resistive coating on the back sheet 102. The voltage level of the points of contact between the front and back coatings is continuously converted by the A2D's 201 and monitored by the microcontroller 202 for voltage drops by measuring the voltage on the un-driven coating.

However, the microcontroller 202 assumes that any touch of the panel is a single touch with a small point contact. Thus, when the touch has a large contact area, such as when a user places a palm onto the panel, or when the touch is a multiple point touch, the value measured s from the large contact area or the multiple points is an average, resulting in a single touch coordinate result.

Accordingly, there exists a need for an improved resistive touch panel. The improved resistive touch panel should be able to determine between small and large areas of contact and multiple point contacts by detecting adjacent contact areas. The present invention addresses such a need.

SUMMARY OF THE INVENTION

An improved resistive touch panel is disclosed. The improved resistive touch panel includes a first plurality of stripes of a resistive coating on a front sheet running in a first direction and a second plurality of stripes of a resistive coating on a back sheet running in a second direction. The overlapping regions between the first and second plurality of stripes are scanned by a controller circuit to detect voltage drops at these regions. Because the overlapping regions are independent of each other, the controller circuit is able to detect the individual regions involved in the touch area. In this manner, the controller circuit is able to determine between small and large areas of contact by detecting adjacent contact areas.

DETAILED DESCRIPTION

The present invention provides an improved resistive touch panel. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 3 through 5 in conjunction with the discussion below.

Figure 1:
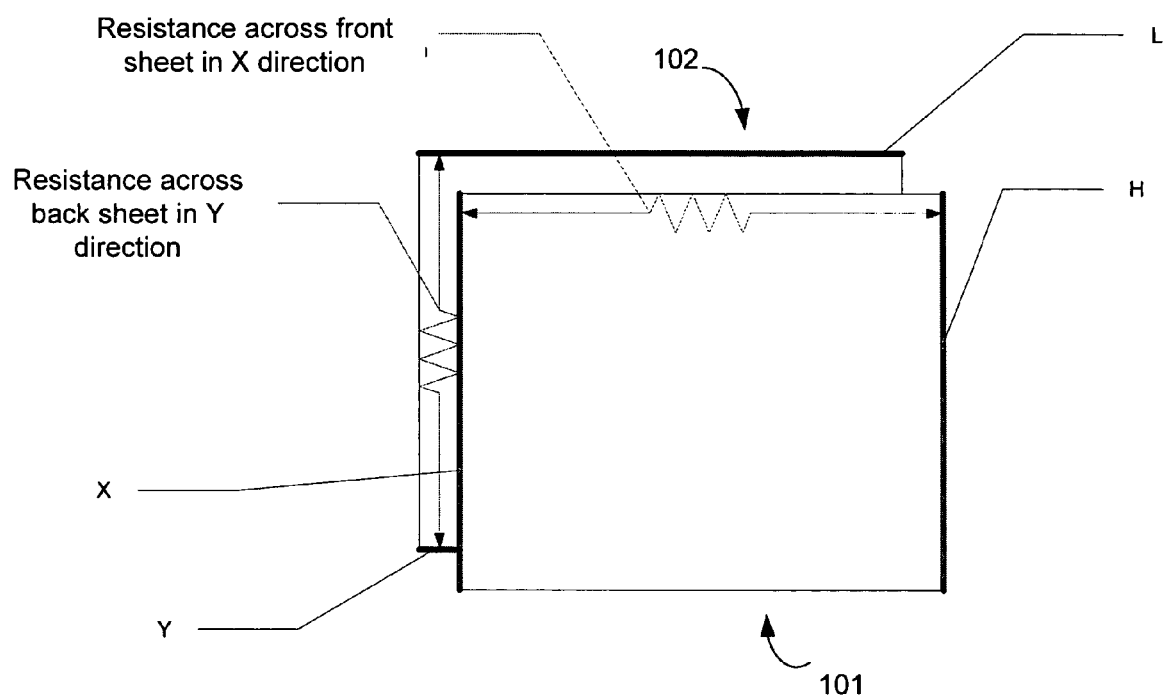
FIG. 1 illustrates a conventional resistive touch panel.
Figure 2:
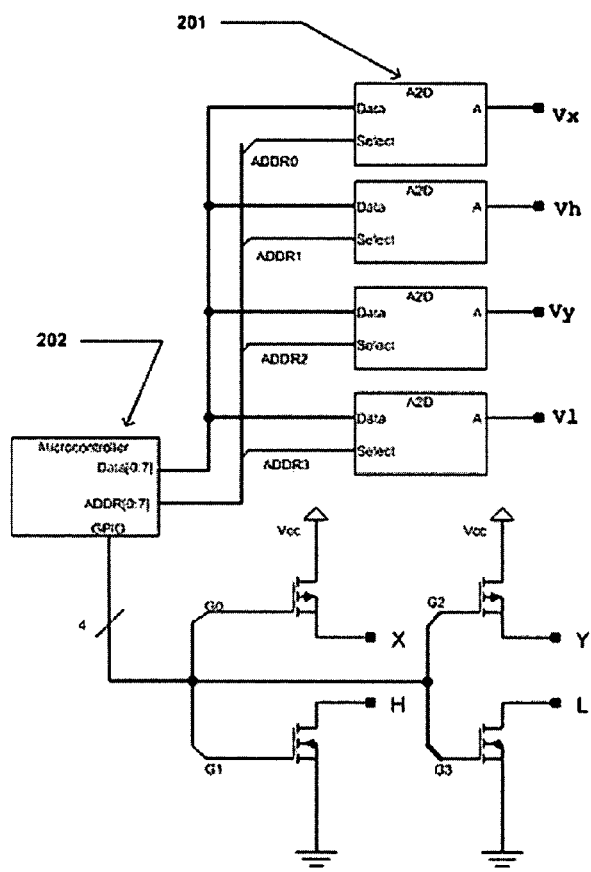
FIG. 2 illustrates a controller circuit for the conventional resistive touch panel.
Figure 2:
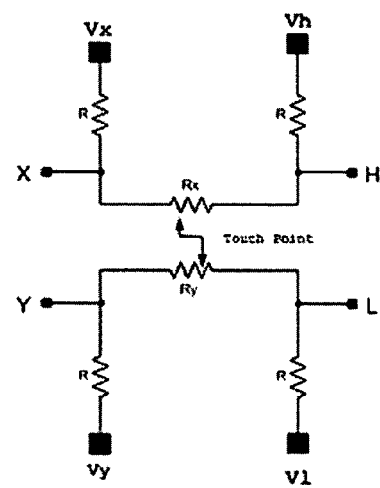
Figure 3:
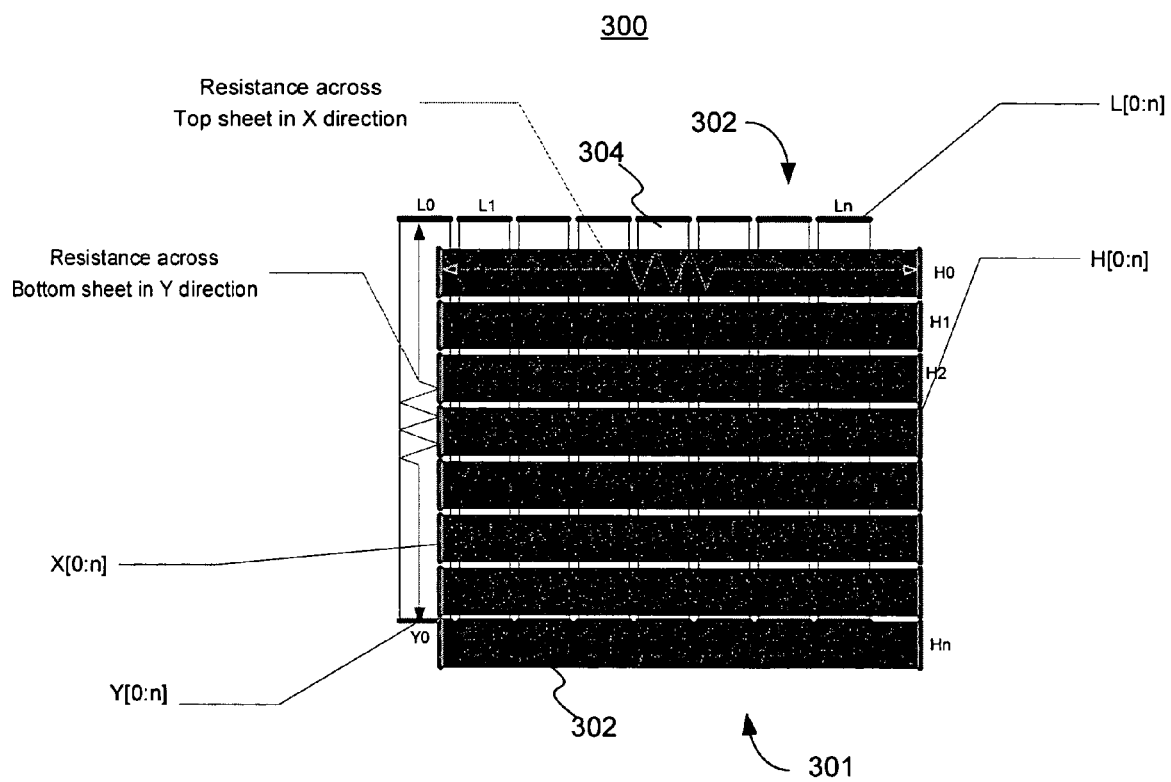
FIG. 3 illustrates an embodiment of a resistive touch panel in accordance with the present invention.
Figure 4:
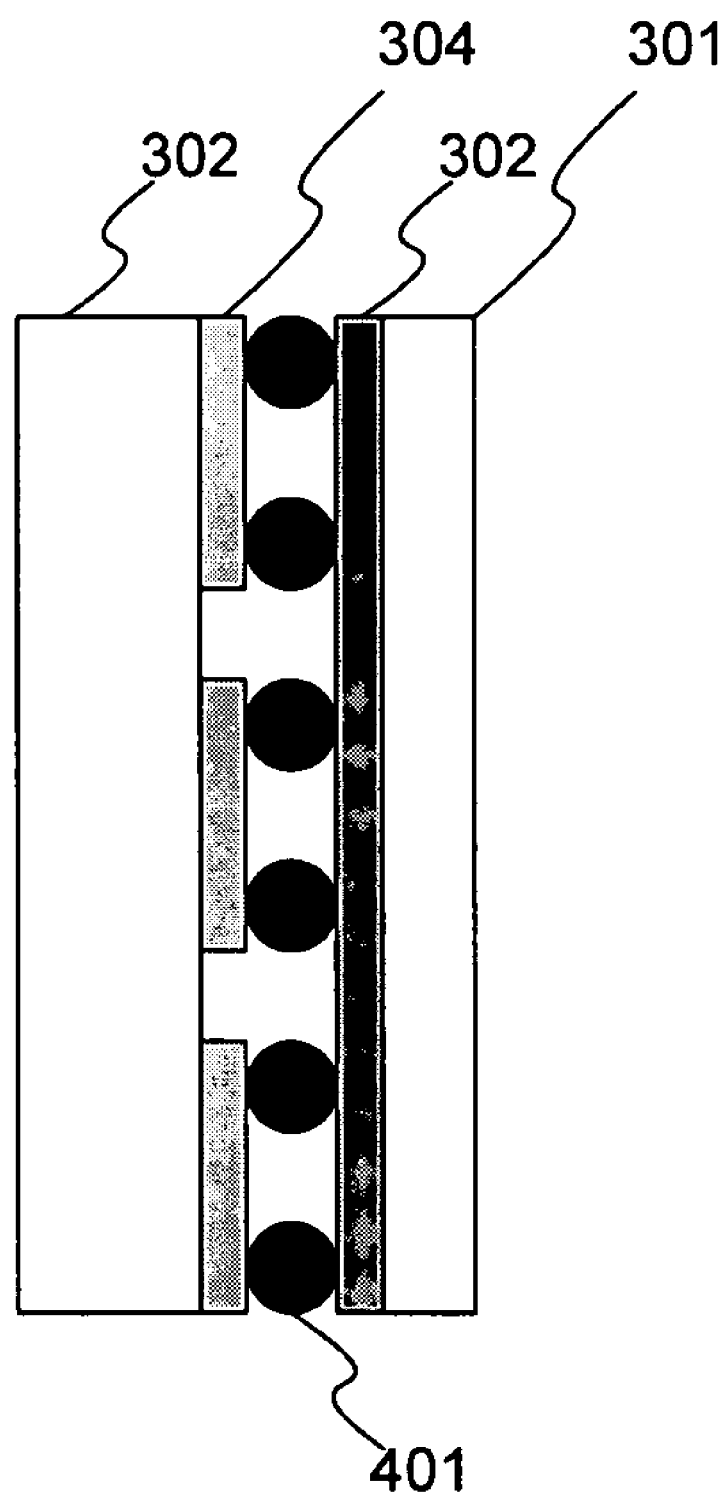
FIG. 4 illustrates a cross-sectional view of the embodiment of the resistive touch panel in accordance with the present invention.

FIG. 3 illustrates an embodiment of a resistive touch panel in accordance with the present invention. The resistive touch panel 300 comprises a front sheet 301 with a first plurality of stripes 303 of a resistive coating and a back sheet 302 with a second plurality of stripes 304 of the resistive coating. In this embodiment, the first plurality of stripes 303 run in a horizontal direction while the second plurality of stripes 304 run in a vertical direction. Each of the stripes 303-304 are independent of each other. The first and second plurality of stripes 303-304 form a plurality of overlapping regions. In between the two sheets 301-302 are a plurality of insulating spacer dots 401, as shown in the cross-sectional view of the panel 300 in FIG. 4. Coupled to the panel 300 is a controller, as described below.

Figure 5:
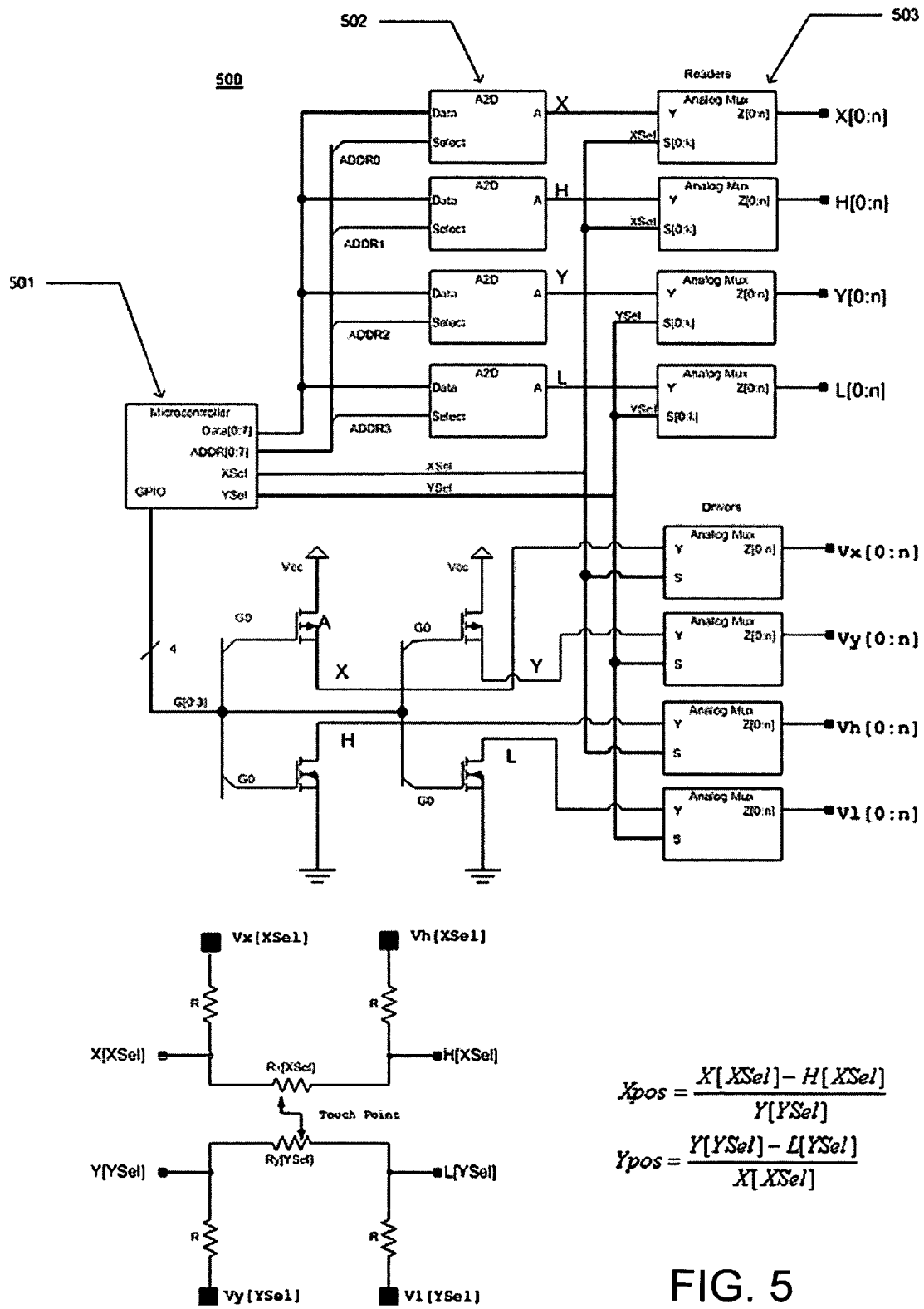
FIG. 5 illustrates an embodiment of a controller circuit for the resistive touch panel in accordance with the present invention.

FIG. 5 illustrates an embodiment of a controller for the resistive touch panel in accordance with the present invention. The controller 500 includes a microcontroller 501, a plurality of analog-to-digital converters (A2D) 502, and a plurality of analog multiplexers (MUX) 503. The controller 500 successively applies a current to the stripes of either the front sheet 101 or the back sheet 302 and successively monitors the stripes on the other coated plane for a point of contact.

Pressure applied to the top sheet 301 causes one or more of the first plurality of stripes 303 to contact one or more of the second plurality of stripes 304 on the back sheet 302. Thus, the touch area involves one or more of the overlapping regions between the stripes 303-304. The controller 500 switches between applying a current to the stripes on the front sheet 301 and the stripes on the back sheet 302. The controller 500 scans the overlapping regions between the stripes 303-304 to detect any voltage drop between the Y side and the H side of the back sheet 301 of a region, and any voltage drop between the X edge and the H edge of the front sheet 302 of the region. Because the regions are independent of each other, the controller 500 is able to detect the individual regions involved in the touch area. In this manner, the controller 500 is able to detect a large touch area or a multiple point touch. The position of the touch can also be accurately determined.

In an alternative embodiment, either the front sheet 301 or the back sheet 302 can comprise a plurality of stripes of the resistive coating while the other sheet comprises a single continuous resistive coating. Although the overlapping regions in this embodiment would be larger than the regions in the embodiment described above, large touch areas and multiple point touches can still be more accurately measured than with conventional panels.

In addition, although the embodiments above are described with horizontal or vertical stripes, one of ordinary skill in the art will understand that the stripes may be in any orientation without departing from the spirit and scope of the present invention.

An improved resistive touch panel has been disclosed. The improved resistive touch panel includes a first plurality of stripes of a resistive coating on a top sheet running in a first direction and a second plurality of stripes of a resistive coating on a bottom sheet running in a second direction. The overlapping regions between the first and second plurality of stripes are scanned by a controller circuit to detect voltage drops at these regions. Because the overlapping regions are independent of each other, the controller circuit is able to detect the individual regions involved in the touch area. In this manner, the controller circuit is able to determine between small and large areas of contact by detecting adjacent contact areas.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A resistive touch panel, comprising:
a first sheet, comprising a plurality of independent stripes of a first resistive coating, the first sheet being transparent;
a second sheet, comprising a second resistive coating separated from the first sheet by a plurality of insulator dots, wherein a voltage difference exists between the second resistive coating and the plurality of independent stripes, wherein the plurality of independent stripes and the second resistive coating form a plurality of independent overlapping regions; and
a controller, coupled to the first sheet and the second sheet, the controller configured to detect a contact between the first sheet and the second sheet in at least one of the plurality of independent overlapping regions and scans the plurality of independent stripes and the second resistive coating to determine a position of the contact, wherein the scanning includes:
switching between applying a current to each of the plurality of independent stripes and monitoring the second sheet and applying the current to the second sheet and monitoring each of the plurality of independent stripes,
determining the position of the contact in a first direction by measuring a first voltage difference between a first and a second side of each of the plurality of independent stripes, when the current is applied to the first sheet, and
determining the position of the contact in a second direction by measuring a second voltage difference between a first and a second side of the second sheet, when the current is applied to the second sheet.

2. The panel of claim 1, wherein the second resistive coating comprises a second plurality of independent stripes of the second resistive coating.

3. The panel of claim 2, wherein the plurality of stripes of the first resistive coating runs in a first orientation, wherein the second independent plurality of independent stripes run in a second orientation different from the first orientation.

4. The panel of claim 3, wherein the second orientation is approximately perpendicular to the first orientation.

5. The panel of claim 1, wherein the controller comprises:
a microcontroller; a plurality of analog-to-digital converters coupled to the microcontroller; and
a plurality of multiplexers coupled to the plurality of analog-to-digital converters.

* * * * *